July 12, 1927.
E. E. KINTZ
1,635,328
EYESHIELD AND FACE PROTECTOR
Filed Jan. 20, 1926
2 Sheets-Sheet 1
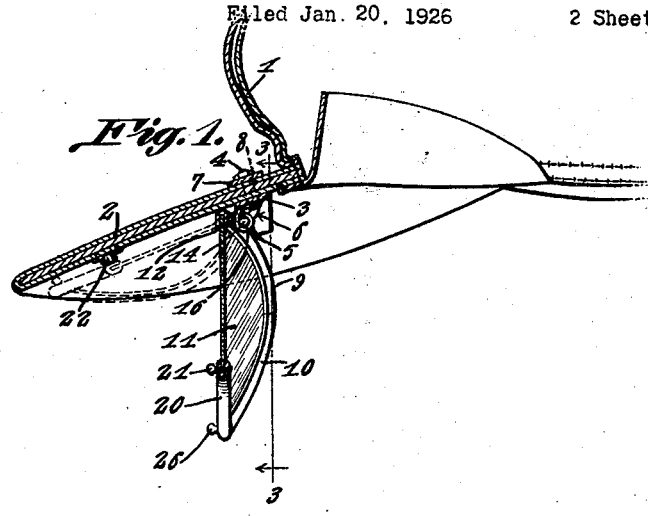
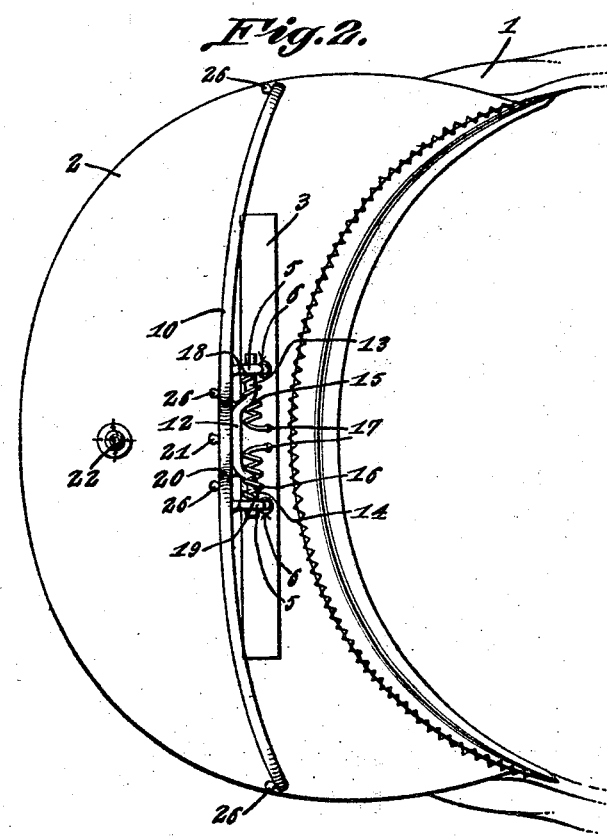
INVENTOR.
BY *Earl Edward Kintz,*
*Geo. P. Kimmel* ATTORNEY.

July 12, 1927.
E. E. KINTZ
EYESHIELD AND FACE PROTECTOR
Filed Jan. 20, 1926  2 Sheets-Sheet 2
1,635,328
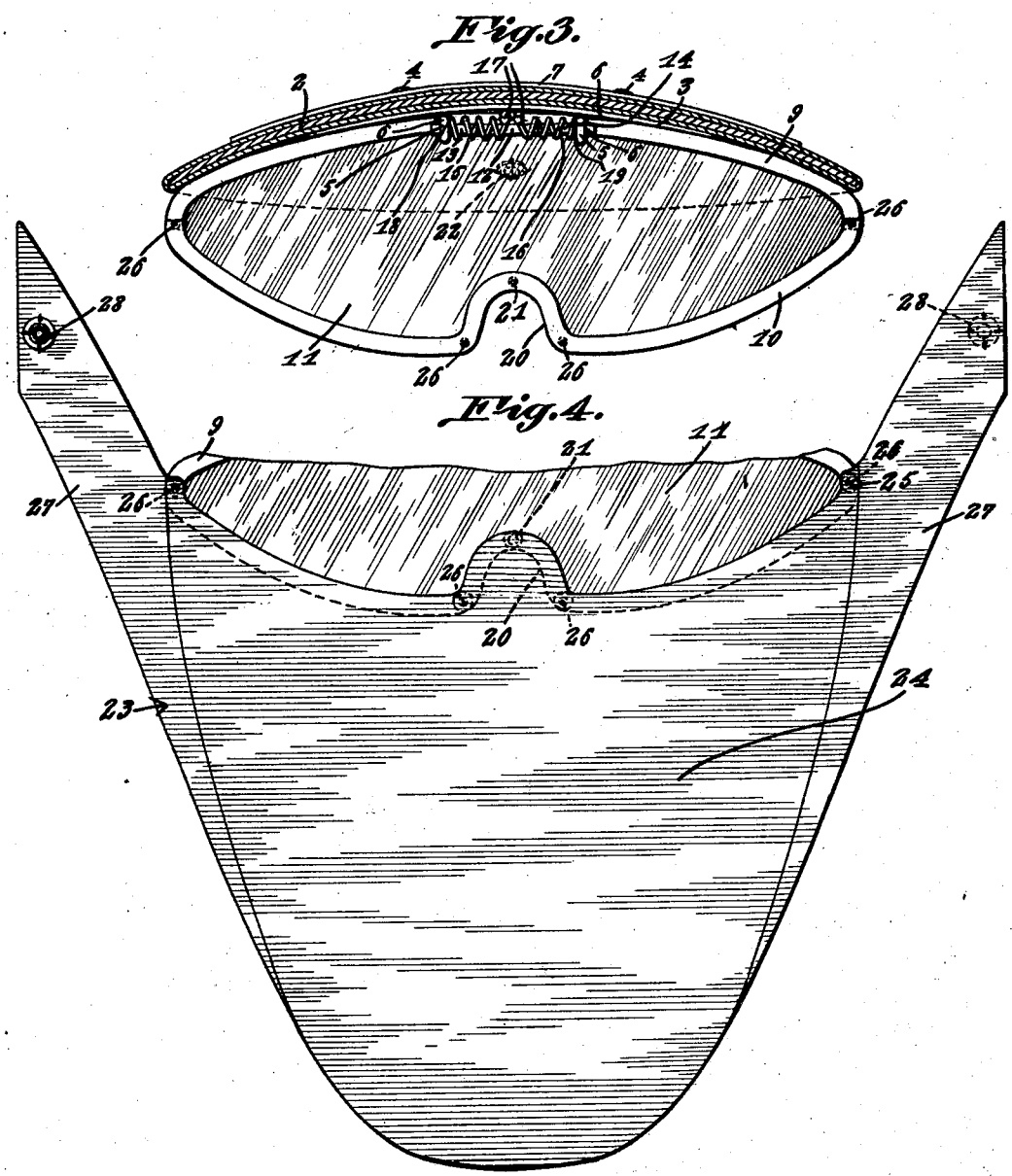
INVENTOR.
BY Earl Edward Kintz,
ATTORNEY.

Patented July 12, 1927.

1,635,328

UNITED STATES PATENT OFFICE.

EARL EDWARD KINTZ, OF BUCYRUS, OHIO.

EYESHIELD AND FACE PROTECTOR.

Application filed January 20, 1926. Serial No. 82,545.

This invention relates to an eye shield and face protecting device for use by chauffeurs, engineers, trainmen, motorcycle drivers, aviators, or by other persons who require eye and face protection when traveling or working in the open, and the invention has for its object to provide, in a manner as hereinafter set forth, a device of the class referred to, including an eye shielding element for connection with the visor of a cap and normally in an inactive position, and capable when shifted to active position to shield the eyes, and with the device further including a detachable face protecting element for connection with the eye shielding element to protect the face from inclement weather when such protecting element is in attached position with respect to the eye shielding element.

Further objects of the invention are to provide, in a manner as hereinafter set forth, a device of the class referred to, which is simple in its construction and arrangement, strong, durable, compact, conveniently installed with respect to the visor of a cap, thoroughly efficient in its use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1 is a vertical sectional view of a device, in accordance with this invention, showing the adaptation thereof with respect to the visor of a cap and with the eye shielding element in active position.

Figure 2 is an inverted plan view of the visor of a cap with the eye shielding element connected therewith and in active position.

Figure 3 is an elevation of the eye shielding element in active position and connected with the visor of a cap and with the visor shown in lengthwise section.

Figure 4 is a fragmentary view, in front elevation, illustrating the eye shielding element and face protecting element in active position.

Referring to the drawings in detail, 1 indicates the body portion of a cap provided at the front thereof with a visor 2, and the latter has secured to its lower face, in proximity to the base of the crown of the cap a lengthwise extending, narrow metallic strip 3 secured in position by a pair of combined coupling and securing devices arranged in spaced relation. Each of the securing devices consists of an eye bolt formed of a shank 4 and a head 5 in the form of an eye. The head 5 extends forwardly at a slight inclination and is positioned against the lower face of the strip 3. The shank 4 extends up through an opening 6 formed in the strip 3 and also through the visor 2 and carries on its upper end a washer 7 and a securing nut 8. The nut 8, in connection with the washer 7 and head 5, clamps the eye bolt to the visor 2 and strip 3.

The eye shielding element, which is of a length to shield both eyes, is set up in a manner whereby when in active position, it will constantly tend to bear against the bridge of the nose whereby such element is maintained in position until it is manually shifted to inactive position. The eye shielding element consists of a substantially elliptical frame formed of an inner section 9 and an outer section 10 which are detachably connected together at their ends in any suitable manner. Mounted in the frame is a shield 11 constructed of any suitable transparent, non-breakable and non-inflammable material and which is common to the eyes of the wearer. The shield 11 is uninterrupted from end to end. The frame is set up of two sections to permit of a damaged shield 11 being removed and a new one substituted when required. The section 9 of the frame has connected thereto, centrally of its rear face, a pivot member consisting of a yoke shaped intermediate portion 12, secured to the section 9 in any suitable manner. The free ends of the arms of the intermediate portion 12 is formed with right angularly disposed extensions. The extensions are indicated at 13, 14, are oppositely disposed with respect to each other and which provide pintles and each of which extends into a head 5 of an eye bolt whereby the eye shielding element is pivotally connected with the visor 2. Arranged rearwardly of the pivot member is a pair of coiled controlling springs 15, 16, and each of which has its inner end anchored, as at 17, to the strip 3. The outer end of the spring 15 is anchored to the pintle 13, as at 18, and the outer end of the spring 16 is anchored to the pintle 14, as at 19. The springs 15 and 16 provide means tending to constantly force the eye shielding element away from the visor 2 and against the face of the wearer when such element is released for the purpose of shielding the eyes.

The section 10 of the frame is provided centrally thereof with a substantially semi-oval shaped inset portion 20 to seat on the bridge of the nose when the eye protecting element is released for shielding purposes. The inset portion 20 is provided with a fastener member 21 of the snap type, and which is adapted to engage in a fastener member 22 secured to the lower face of the visor 2, near its forward edge. The members 21 and 22 coact for releasably securing the eye protecting member in inactive position, as illustrated in dotted lines Figure 1, and against the action of the controlling springs 15 and 16.

The face protecting element is referred to generally by the reference character 23 and is formed of a body portion 24 of any suitable flexible material. The body portion 24, at its top, is provided with a series of spaced fastener members 25, which coact with fastener members 26 on the section 10 of the frame of the eye shielding element for the purpose of detachably connecting the protecting element 23 in position and so that it will depend from the eye shielding element. The body portion 24, at its lower end, is formed with a pair of oppositely disposed extensions 27, each provided with a fastener member 28. When the element 23 is not desired for use it is disconnected from the eye shielding element. The element 23 is of such size that it will extend to the bottom part of the face below the chin and then around and fastened on the back of the head by the engagement with each other of the fastener members on the extensions, so that when in use, in connection with the eye shielding element, the entire face will be protected.

It is thought the many advantages of a device, in accordance with this invention and for the purpose set forth, can be readily understood, and although the preferred embodiment of the invention is as illustrated and described, yet it is to be understood that changes in the details of construction can be had which will fall within the scope of the invention as claimed.

What I claim is:—

A combined eye shield and face protector comprising a substantially elliptical shaped, spring controlled frame adapted to be pivotally connected with the lower face of the visor, said frame having its outer side, centrally thereof, formed with a substantially semi-oval shaped portion for bridging the nose of the wearer, an uninterrupted, transparent shield element secured within the frame and of the same area and contour as that of the opening formed by the latter and further of a size to shield both eyes of the wearer, spaced holdfast devices arranged on the outer side of the frame and on said semi-oval shaped portion, a flexible face protecting element, and spaced fastener members carried by the upper end of such protecting element and coacting with said devices for connecting said upper end to the outer side of said frame.

In testimony whereof, I affix my signature hereto.

EARL EDWARD KINTZ.